US006381654B1

(12) United States Patent
Brawn et al.

(10) Patent No.: US 6,381,654 B1
(45) Date of Patent: Apr. 30, 2002

(54) SYSTEMS METHODS AND COMPUTER PROGRAM PRODUCTS FOR CUSTOMIZED HOST ACCESS APPLICATIONS INCLUDING USER-REPLACEABLE TRANSPORT CODE

(75) Inventors: Thomas J. Brawn, Apex; Gregory T. Knowles; Yongcheng Li, both of Raleigh; Brad Marchesseault, Cary; Yih-Shin Tan, Raleigh, all of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/060,530

(22) Filed: Apr. 15, 1998

(51) Int. Cl.[7] .................................................. G06F 9/54
(52) U.S. Cl. ...................................................... 709/331
(58) Field of Search ................................. 709/310–332, 709/200–231; 345/335

(56) References Cited

U.S. PATENT DOCUMENTS

| | | | | | |
|---|---|---|---|---|---|
| 5,461,716 A | * | 10/1995 | Eagen et al. | ................. | 345/788 |
| 5,659,676 A | * | 8/1997 | Redpath | ....................... | 707/515 |
| 5,673,322 A | * | 9/1997 | Pepe et al. | ..................... | 380/49 |
| 5,680,615 A | * | 10/1997 | Marlin et al. | ................. | 707/103 |
| 5,914,713 A | * | 6/1999 | Nario et al. | .................. | 345/335 |
| 5,971,632 A | * | 10/1999 | LaDue et al. | .................. | 400/68 |
| 6,014,702 A | * | 1/2000 | King et al. | .................... | 709/227 |
| 6,044,225 A | * | 3/2000 | Spencer et al. | .............. | 395/872 |
| 6,049,832 A | * | 4/2000 | Brim et al. | ................... | 709/237 |
| 6,085,224 A | * | 7/2000 | Wagner | ....................... | 709/203 |
| 6,122,661 A | * | 9/2000 | Stedman et al. | ............. | 709/217 |
| 6,185,617 B1 | * | 2/2001 | Housel, III et al. | .......... | 709/227 |

* cited by examiner

Primary Examiner—St. John Courtenay, III
Assistant Examiner—Van H. Nguyen

(57) ABSTRACT

Host communications software is modified to include user-provided transport code for sending and receiving datastreams to and from a host. A user transport code component is provided to the host communications software, and the user transport code component is dynamically linked to a datastream processing component of the host communications software. Dynamically linking a datastream processing component of the host communications software and the user transport code component includes defining transport events, and providing interfaces to listen and handle the transport events. Host access software can be redesigned into a collection of dynamically connectable and reusable, self-contained, functional components that software developers can use to generate host access applications.

36 Claims, 9 Drawing Sheets

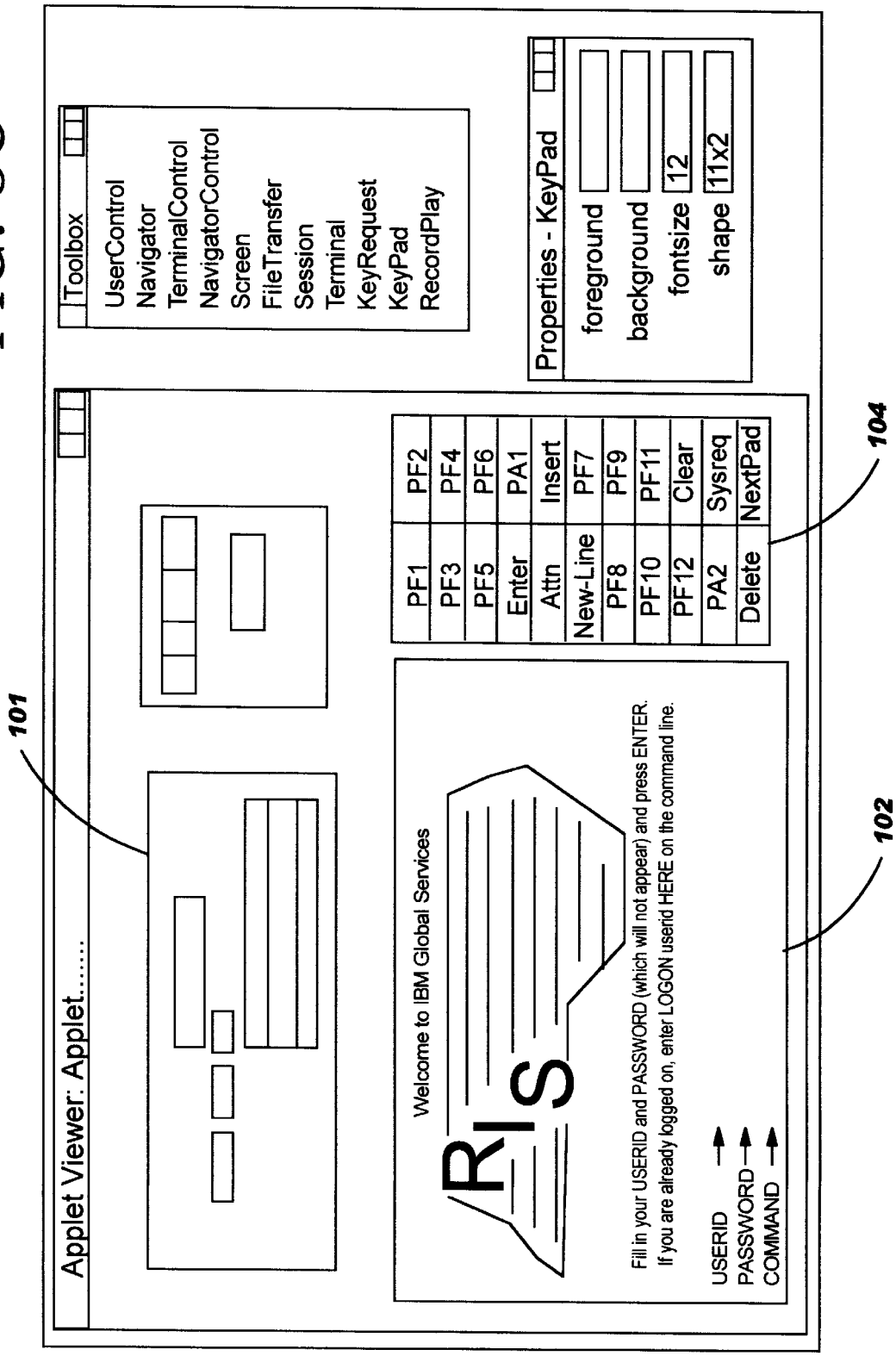

SYSTEMS METHODS AND COMPUTER PROGRAM PRODUCTS FOR CUSTOMIZED HOST ACCESS APPLICATIONS INCLUDING USER-REPLACEABLE TRANSPORT CODE

FIELD OF THE INVENTION

The present invention relates generally to host communications and, more particularly, to host communications software.

BACKGROUND OF THE INVENTION

Mainframe computer systems are widely used for a variety of data processing functions. For example, many corporate financial and accounting systems were developed for, and operate on, mainframe computing systems. Although the use of personal computers and personal computer networks has proliferated in recent years, mainframe application systems, referred to as legacy systems, are expected to remain popular for many types of data processing well into the next century.

A mainframe computing system typically includes multiple user terminals connected to a mainframe host (hereinafter "host"). Various systems are available for establishing host communications. The International Business Machine Corporation's 3270 terminal system is one of the more widely-used systems for communicating with host computers. Typically, a 3270 terminal does not have its own data processing capability. A 3270 terminal typically displays screens generated by applications running on a host and communicates information from a user back to a host for processing. A user interface of an IBM 3270 terminal system comprises a plurality of screens that are generated by host applications for display on the 3270 terminal. Over the past few years, many 3270 terminals have been replaced with personal computers (PCs) configured to communicate with mainframe computing systems via 3270 terminal emulation software. Host access is also available via the World Wide Web (Web). Various host access software is available for accessing legacy systems via the Web, such as International Business Machine Corporation's Host On-Demand (HOD) application program.

Conventional host communications software, whether traditional (e.g., standalone terminal emulator) or web-based (e.g., HOD) may include various transport protocols intertwined with host datastream processing. A variety of conventional transport protocols, such as Transmission Control Protocol/Internet Protocol (TCP/IP) and Systems Network Architecture (SNA), may be supported by conventional host communications software. However, conventional transport protocols may not meet the specialized needs of users who require different or customized transport protocols. Accordingly, users who require different or customized transport protocols typically have customized modifications made to conventional host communications software or have developed their own host communications software. Unfortunately, developing custom host communications software may be expensive and/or time consuming.

In addition, terminal emulation software may provide application program interface (API) level programming capability so that host information can be integrated with customer-developed workstation applications. A programmed interface runs on top of the emulation software on a workstation, simulates keystrokes against the emulator screen, and copies data to and from the interface (screen scraping). Because emulators simply relay text-based output of host applications, host applications were developed to gather information and display the information in a more usable and appealing graphical user interface (GUI). Some implementations may also manipulate datastreams before the datastreams are formatted for screen output. These capabilities may be valuable to emulator users who automate repetitive tasks, mask host applications and integrate host information with workstation software.

An example is a point-and-click front-end GUI that allows users to search a host database that has difficult textual command sequences. The application can receive input from a user in the form of windowed check boxes or drop-down list selections and translate the input into textual commands necessary to present the user with a more user-friendly list of results. Unfortunately, API-level programming to access host information directly from host datastreams may be somewhat complex.

SUMMARY OF THE INVENTION

In view of the above discussion, it is an object of the present invention to allow users to customize transport protocols of host datastream processing without requiring modifications to host datastream processing code.

It is another object of the present invention to facilitate the integration of host information with customer-developed workstation applications.

These and other objects of the present invention are provided, according to an aspect of the present invention, by systems, methods and computer program products for modifying host communications software to include user-provided transport code for sending and receiving datastreams to and from a host. A user transport code component is provided to the host communications software, and the user transport code component is dynamically linked to a datastream processing component of the host communications software. Dynamically linking a datastream processing component of the host communications software and the user transport code component includes defining transport events, and providing interfaces to listen and handle the transport events.

According to another aspect of the present invention, datastreams can be transmitted and received to and from a host via host communications software, wherein the host communications software includes a host datastream processing component dynamically linked with a user transport component. A user transport component may include transport protocol different from transport protocol of the host communications software. In response to receiving a start host session request, a transport event from a host datastream processing component is transmitted to a user transport component. Responsive to receiving the transport event, a connection is established with a host via the user transport component. For outbound datastreams received by the user transport component from the host, the outbound datastreams are unwrapped from format code of the host communications software. Inbound datastreams constructed by the host datastream processing component are transmitted to the user transport component and are wrapped, via the user transport component, in a transport format of the user transport component. The wrapped inbound datastreams are then transmitted to the host. Accordingly, the present invention allows user-supplied transport protocol to be utilized with host datastream processing software without requiring modification of the host datastream processing software.

According to another aspect of the present invention, host access software can be redesigned into a collection of dynamically connectable and reusable, self-contained, functional components referred to as Host Access components (or beans) that software developers can use to generate host access applications. Host access applications can be generated by placing a plurality of dynamically connectable, reusable components within a development space, and wiring the components together such that the components can transmit and receive information therebetween so as to function as a host access application at run time. Each dynamically connectable, reusable component is configured to perform a respective host access application task.

BRIEF DESCRIPTION OF THE DRAWINGS

FIG. 8C illustrates an actual development window containing a plurality of reusable components, according to the present invention.

DETAILED DESCRIPTION OF THE INVENTION

Figure 1:
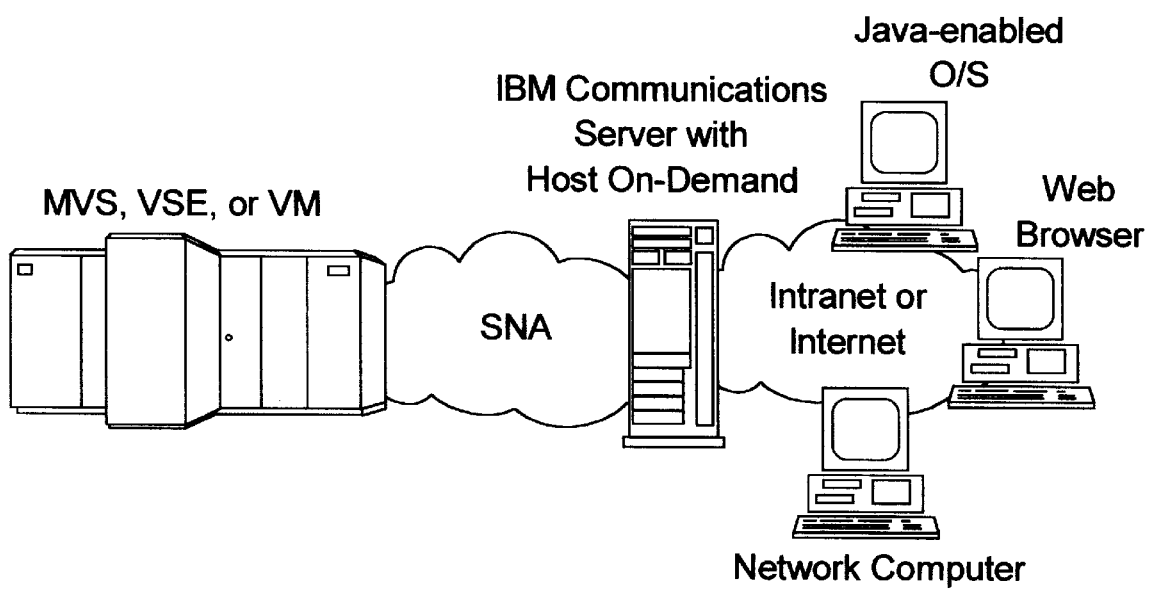
FIG. 1 schematically illustrates an architecture for implementing Host On-Demand host communications.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects. Furthermore, the present invention may take the form of a computer program product on a computer-usable storage medium having computer-usable program code means embodied in the medium. Any suitable computer readable medium may be utilized including hard disks, CD-ROMs, optical storage devices, or magnetic storage devices.

The software for implementing the present invention may comprise a plurality of modules, each controlling operations described in detail below. Preferably, each module comprises computer code written in Java®. However, the present invention may be written in various object oriented programming languages such as C++ and Smalltalk.

Preferably, software for implementing the present invention may run on current standard Web server platforms such as, but not limited to, Windows 95®, Windows NT®, UNIX®, OS/2®, Sun Solaris®, and Apache. Portions of software may be designed to execute within a browser on a client machine. The present invention may be utilized with many standard features of current client-server and desk-top configurations, such as the ability to store data locally, connect to the Internet, and display visual information.

Java®

Java® is an object-oriented programming language developed by Sun Microsystems, Mountain View, California. Java® is a portable and architecturally neutral language. Java® source code is compiled into a machine-independent format that can be run on any machine with a Java® runtime system known as the Java® Virtual Machine (JVM). The JVM is defined as an imaginary machine that is implemented by emulating a processor through the use of software on a real machine. Accordingly machines running under diverse operating systems, including UNIX, Windows NT, and MacIntosh having a JVM can execute the same Java® program.

Web browsers including Netscape Navigator® and Microsoft Internet Explorer® are referred to as Java®-enabled browsers because they include a version of the JVM. Java® applets are programs written in Java® and configured to run within Java®-enabled browsers. Handled in a manner similar to the way images are handled, Java® applets are displayed as part of a HyperText Mark Up Language (HTML) document. When an applet is loaded, it can present special effects, such as animation, graphics, and sound, perform real-time data updates and applications, and can interact with a user through a mouse, keyboard and various interface elements such as buttons, slides and text fields.

Java® source code is compiled into bytecode using a Java® compiler referred to as a Javac. Compiled Javas programs are saved in files with the extension ".class". When a Java®-enabled web browser recognizes that an applet has been requested, a Java® interpreter program runs the applet bytecode on the JVM.

JavaBeans

JavaBeans is a portable, platform-independent component model written in the Java® programming language. JavaBeans enables developers to write reusable Java® components once and run them anywhere. JavaBeans components, or beans, are reusable software components that can be manipulated visually in a builder tool. Beans can be combined to create traditional applications, or applets. In addition, applets can be designed to work as reusable beans. Individual beans may function quite differently. However, typical unifying features that distinguish a bean are: 1)

Introspection: enables a builder tool to analyze how a bean works; 2) Customization: enables a developer to use an app builder tool to customize the appearance and behavior of a bean; 3) Events: enables beans to communicate and connect together; 4) Properties: enable developers to customize and program with beans; 5) Persistence: enables developers to customize beans in an app builder, and then retrieve those beans, with customized features intact, for future use.

Host On-Demand (HOD)

Host On-Demand (HOD) is an Internet-to-SNA communications product that allows users to access various non-Internet-based host content and services such as public catalogs, software applications, databases and other resources from within a Java®-enabled desktop or Web browser. HOD is implemented via a Java® applet without requiring terminal emulation software to be installed on a user's computer. When a user clicks on an SNA application hyperlink, HOD dynamically downloads a Java®-based TN3270, TN5250 and VT emulator to the user's desktop. FIG. 1 schematically illustrates an implementation of HOD.

HOD can provide a true, bidirectional session between a user and a host application. Unlike HTML mapping software where connections to a Web server are constantly being terminated and reconnected, HOD provides a persistent connection to a server, eliminating interruptions caused by connecting and reconnecting. Providing a persistent connection may improve network security by denying unauthorized connections to an authorized session. In addition, response time may be faster because a user does not have to wait to reconnect to a broken connection. Persistent connections may help reduce network traffic, too, by utilizing bandwidth in a stable, uninterrupted manner.

Figure 2:
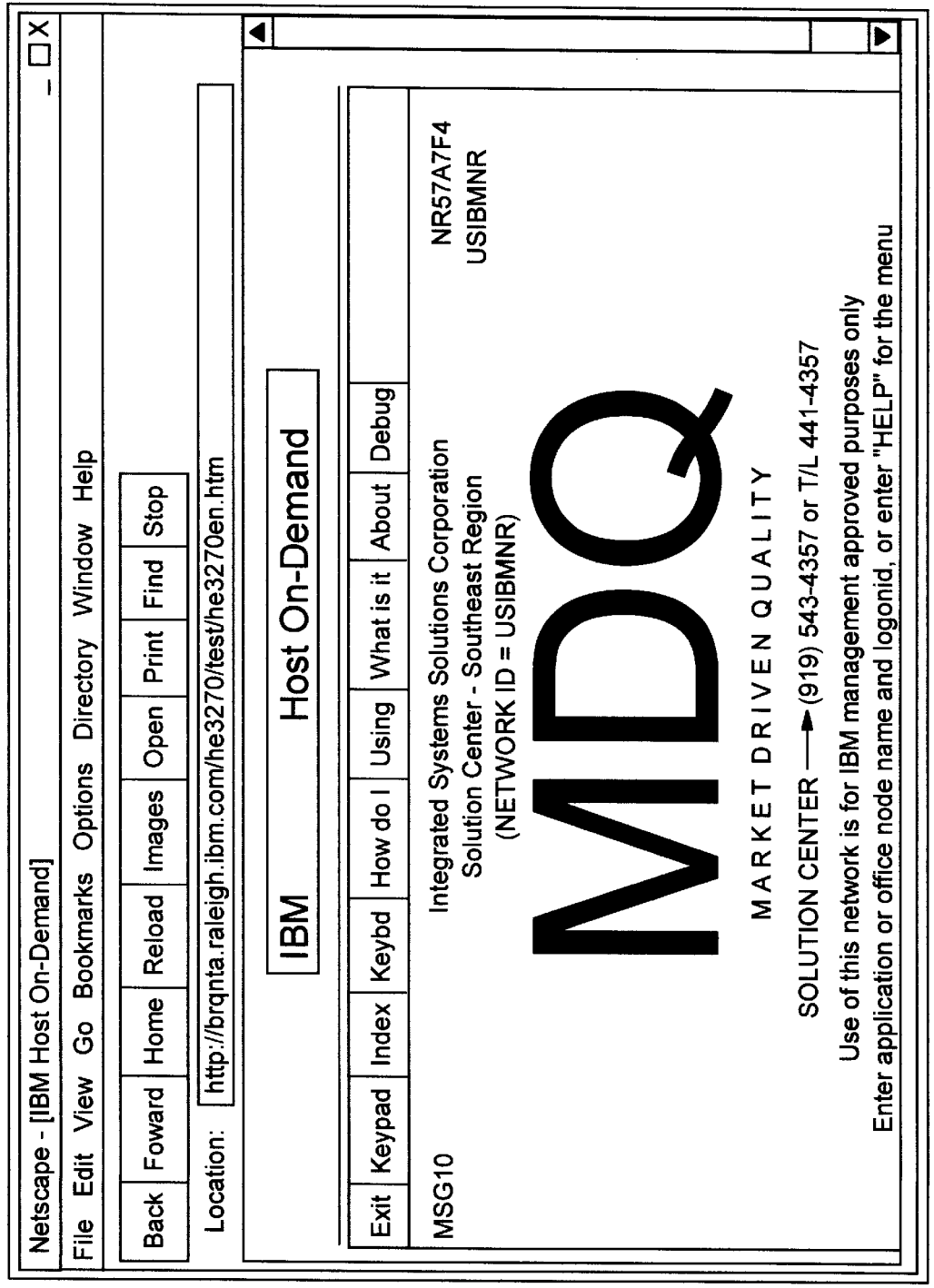
FIG. 2 illustrates a Host On-Demand TN3270 Java applet running within a Web browser.

FIG. 2 illustrates a Host On-Demand TN3270 Java® applet running within a Web browser. The Host On-Demand TN3270 Java® applet provides an intuitive, window user interface that has functions and interactions associated with traditional 3270 terminal screens.

The IBM eNetwork Host On-Demand Host Access Class Library (Host Access API) for Java® provides a core set of classes and methods that allow the development of platform-independent applications that can access host information at the data stream level. The Host Access API implements the core host access function in a complete class model that is independent of any graphical display and only requires a Java®-enabled browser or comparable Java® environment to operate. The Host Access API represents an object-oriented abstraction of a host connection that includes: reading and writing the host presentation space; enumerating the fields in the presentation space; reading the operator information area (OIA) for status information; transferring files; and performing asynchronous notification of significant events.

With the Host Access API, application developers can write Java® applets that manipulate data from the data stream presentation space (such as 3270, 5250, VT) without requiring users to have the applets residing on their client machines. The presentation space represents an imaginary terminal screen that contains both data and associated attributes presented by host applications. These Java® applets can: open a session to the host; wait for incoming host data; get specific strings from the imaginary screen; get associated attributes on the strings; set new string values; send stream function keys back to the host; and wait for the next host response.

The Host Access API is a significant improvement over client-specific, screen-scraping applications like EHLLAPI (Emulator High-Level Language Application Programming Interfaces), in several ways. Host Access API is platform independent and operates directly on a data stream, rather than on an interpreted emulator screen. This eliminates the overhead of interpreting and displaying the datastream in a visual window. Host Access API does not require emulator software running on a local workstation, which reduces dependencies on platform-specific screen formats and keyboard layouts. Host Access API is downloadable and executable on client workstations using standard Web and Java® technology. This may provide significant maintenance and resource savings.

Figure 3A:
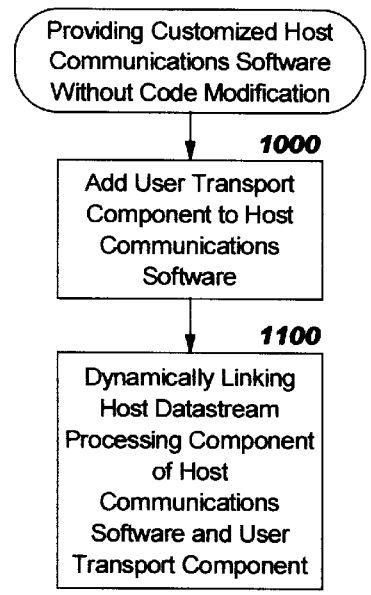
FIGS. 3A–3C schematically illustrate operations for providing customized host communications software without requiring baseline code modification, according to the present invention.
Figure 3B:
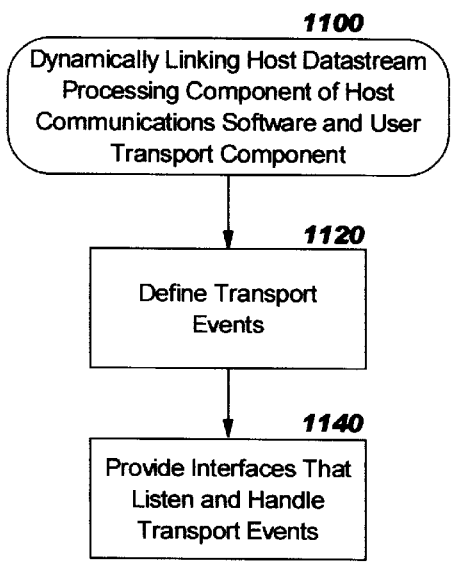
Figure 3C:
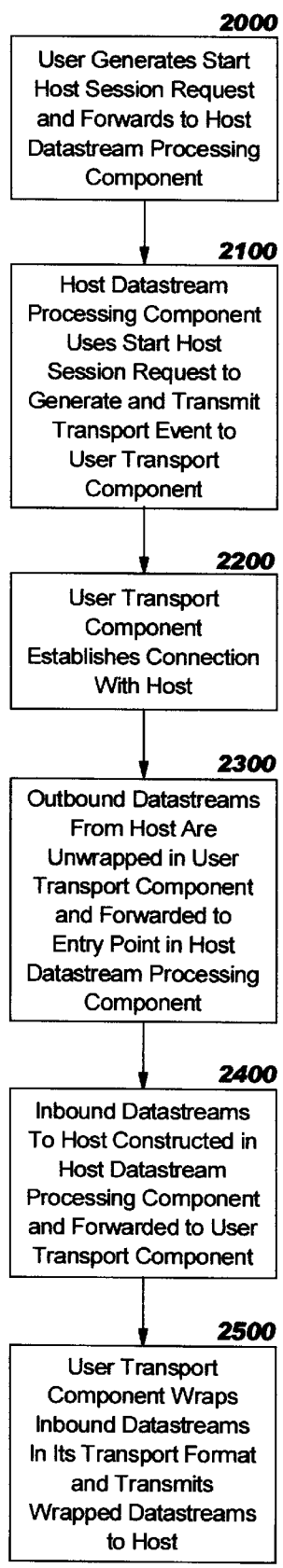

Integration of User-Supplied Transport Component with Portable, Standard, Platform-Independent Datastream Processing for Host Communications Operations according to the present invention for providing customized host,communications software without requiring HOD code modification are illustrated in FIGS. 3A–3C. Referring to FIG. 3A, a user-supplied transport component is added to host communications software (Block 1000). Dynamic hookups or links between a host datastream processing component of the host communications software and a user-supplied transport component are then enabled (Block 1100). FIG. 3B illustrates operations for enabling dynamic hookups between a host datastream processing component of the host communications software and a user-supplied transport component of Block 1100 of FIG. 3A. The dynamic hookups are enabled by defining transport events (Block 1120) and then providing interfaces that listen and handle transport events (Block 1140).

Referring to FIG. 3C, operations for sending and receiving data from a host, according to the present invention, are illustrated. A user generates a start host session request and forwards the request to a host datastream processing component (Block 2000). A host datastream processing component uses the received start session request to generate and transmit a transport event to a user transport component (Block 2100). A user transport component dynamically linked with a host datastream processing component establishes a connection between a workstation and a host (Block 2200).

Outbound datastreams from the host are unwrapped in the user transport component and forwarded to an entry point in the host datastream processing component (Block 2300). Inbound datastreams to the host are constructed in the host datastream processing component and forwarded to a user transport component (Block 2400). A user transport component wraps inbound datastreams received from a host datastream processing component in the transport format of the user transport component and transmits the wrapped datastreams to the host (Block 2500).

Figure 4:
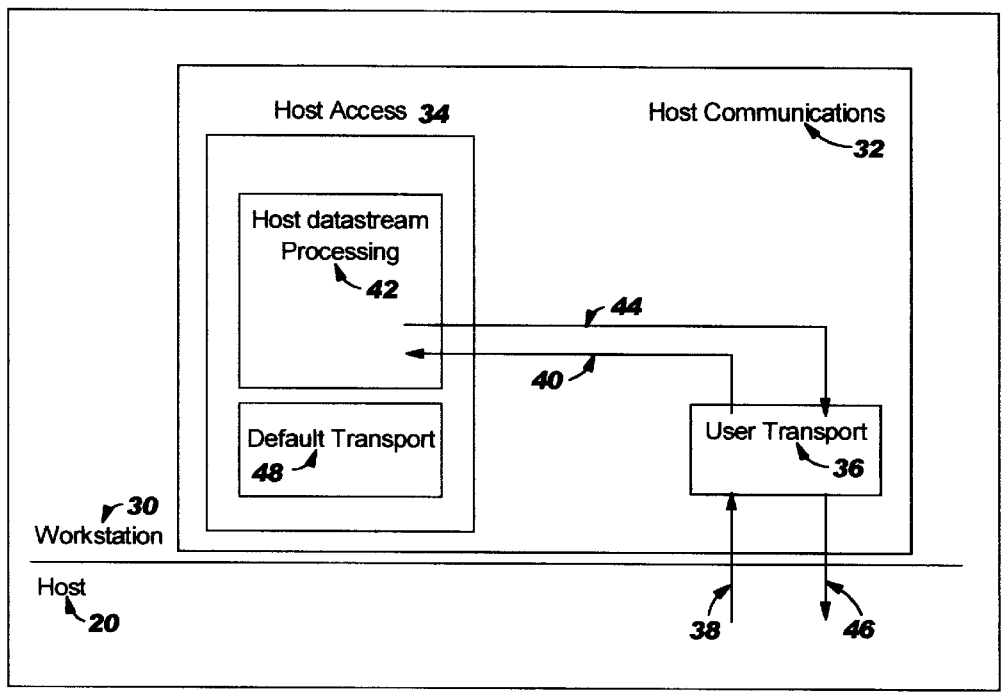
FIG. 4 schematically illustrates host communications between a host and workstation wherein a user-supplied transport component is added to host communications software according to the present invention.
Figure 6:
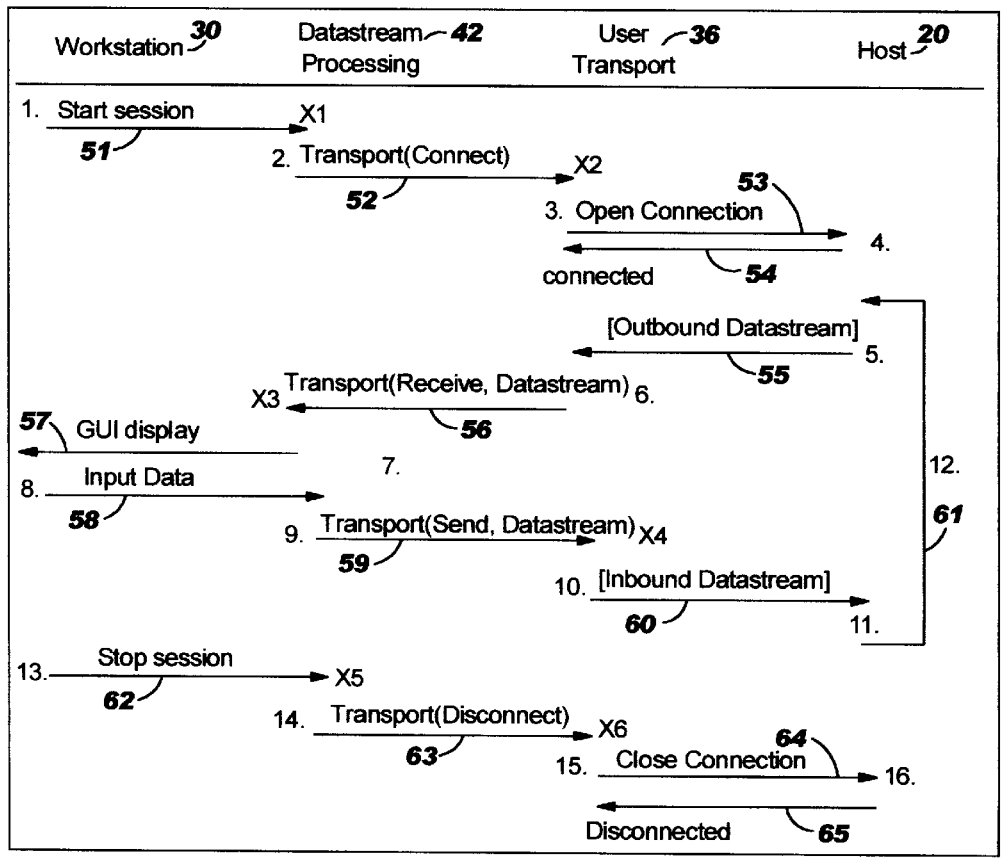
FIG. 6 schematically illustrates data flow between entry points for making host connections and sending/receiving datastreams to and from a workstation, according to aspects of the present invention.
Figure 5:
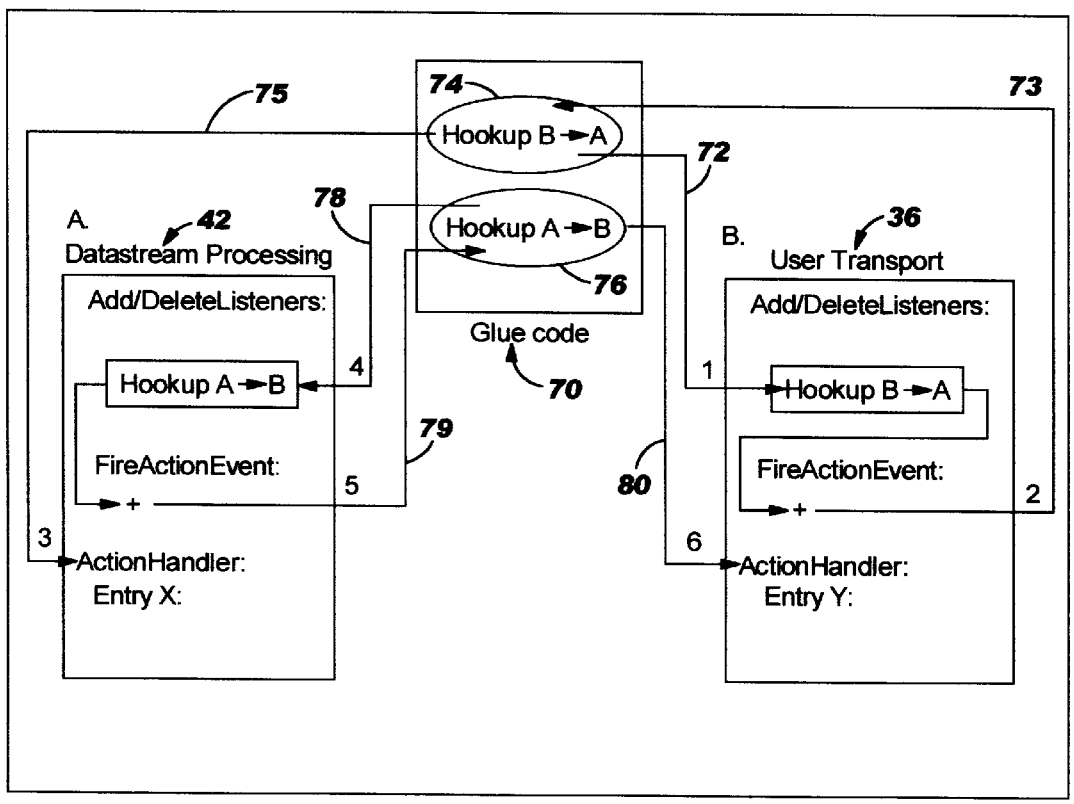
FIG. 5 schematically illustrates operations for making a datastream processing component and user transport component aware of each other, according to the present invention.

The above operations are now described in detail with respect to FIGS. 4–6. Referring initially to FIG. 4, host communications between a host 20 and workstation 30, according to aspects of the present invention, are schematically illustrated. Host communications software 32 includes a host access component 34 and a user-supplied transport component 36.

The user-supplied transport component 36 is responsible for making the connection to a host including initiation, session negotiation, termination, and flowing host datastreams over the established connection path between the workstation and host. Without changing the content and logical format of the datastreams, the user-supplied transport component 36 uses specific communications protocol (e.g., TCP/IP or SNA LU2) to make the initial connection, negotiate session configuration options (often referred to as handshakes), and convert between the logical data format (which is understood by both the host application and the workstation host communication software) and the physical format (which is understood by the protocol) for sending and receiving data. The host communications software is generated by the developer of the software from the reusable host access component(s) supplied by HOD and a user-supplied transport component 36 that performs the above function.

The host access component 34 and user-supplied transport component 36 are made aware of each other by enabling dynamic hookups or links between a host datastream processing component 42 and the user transport component 36. The host datastream processing component 42 is the next component up from the user transport component 36 in the entire host access component architecture. The function of the host datastream processing component 42 is to parse a datastream received from the host in its logical format and to forward the result to other components for processing. On the sending side, the host datastream processing component 42 is invoked (by other components) when the workstation user presses a function key (from the keyboard) to construct and send back to the host a new datastream from the current state of user manipulation of the received datastream.

When the user transport component 36 establishes a connection with a host 20, outbound datastreams (e.g., 3270 datastreams) from the host 20 (schematically illustrated by arrow 38) are unwrapped in the user transport component 36. These unwrapped datastreams are forwarded (schematically illustrated by arrow 40) to a data receive entry point in a host datastream processing component 42.

Wrapping is the processing that converts the datastream from its logical format to the physical format required by the communications protocol the user transport component 36 is using. Unwrapping is the processing that converts the datastream from the physical format required by the communications protocol the user transport component 36 is using to its logical format. An entry point is the place in the host datastream processing component 42 where the datastream parsing (for receive) process begins. An entry point may also be a place where a specific process begins.

Inbound data streams to the host 20 are constructed in the data stream processing subcomponent 42 and forwarded (schematically illustrated by arrow 44) to the user transport component 36. The user transport component 36 wraps the data in its own transport format and transmits the wrapped data to the host 20 (schematically illustrated by arrow 46). If a user transport component 36 does not exist, a default transport subcomponent 48 may be used to send and receive data streams to and from the host 20.

Referring now to FIG. 5, operations for making the illustrated datastream processing component 42 and user transport component 36 aware of each other so that customer written transport code can be combined dynamically with mainline host datastream processing without modifications of any baseline code is schematically illustrated. Both components (the datastream processing component 42 and user transport component 36) implement glue code 70. Glue code implementation includes defining transport events illustrated schematically in FIG. 4 and providing interfaces that listen and handle these events.

The datastream processing component 42 and user transport component 36 implement a common transport listener interface to make the user transport component 36 responsible for sending and receiving datastreams to and from the host. In Sun Microsystems' Java Developer Kit 1.1 (JDK) specifications, a Java bean generates events to which other beans or code segments respond. The other beans and code segments are called listeners and provide event handler methods to process the events. The origination bean provides standard addlistener and removelistener methods to let other beans register themselves as listeners. The origination bean will then invoke the listener's event handler when the specific event occurs at run time. The transport listener interface defines transport events illustrated schematically in FIG. 5 and event handler methods for one component to listen and respond to the events sent by the other component. To enable the interface, glue code 70 needs to be written, or generated if a visual programming language is used, for the host communications software.

The glue code 70 begins the process of connecting the user transport component 36 to the datastream processing component 42 by creating a hookup instance 74 for the hookup process from the user transport component 36 to the datastream processing component 42 and adding it as a listener to the transport events generated by the user transport component 36. In addition, the glue code 70 configures the datastream processing component 42 as the target component for processing transport events (schematically illustrated by arrow 72). As a result, transport events occur as they are transmitted over to the hookup instance 74 (schematically illustrated by arrow 73). Transport events are forwarded from the hookup instance 74 to the actual action handler in the datastream processing component 42 and are distributed (schematically illustrated by arrow 75) to specific entry points in the datastream processing component 42.

The glue code 70 undergoes a process of connecting the datastream processing component 42 to the user transport component 36 in a manner similar to that described above. A hookup instance 76 for the hookup process from the datastream processing component 42 to the user transport component 36 is created and added as a listener to the transport events generated by the datastream processing component 42. In addition, the glue code 70 configures the user transport component 36 as the target component for processing transport events (schematically illustrated by arrow 78). As a result, transport events occur as they are transmitted over to the hookup instance 76 (schematically illustrated by arrow 79). Transport events are forwarded from the hookup instance 76 to the actual action handler in the user transport component 42 and are distributed to specific entry points (schematically illustrated by arrow 80).

Referring now to FIG. 6, data flow between entry points for making host connections and sending/receiving datastreams to and from a workstation, according to aspects of the present invention, is schematically illustrated. In an exemplary scenario, a user clicks on a connect button (or performs another similar function) from a workstation user interface to start a host session request 51. The session request 51 is caught at entry point X1 by a host datastream processing component 42. A transport (connect) event 52 is then generated by the host datastream processing component 42 and transmitted to be caught by entry point X2 of a user transport component 36. The user transport component 36 establishes a host connection using an agreed-upon protocol to bring about a ready state to allow data interchange (schematically illustrated by arrows 53 and 54) to begin.

Data interchange between the host 20 and workstation 30 is a repetitive process illustrated by process steps 55 through 61. For example, the host 20 sends an outbound datastream 55 wrapped in the host's transport code to the user transport component 36. The user transport component 36 extracts the received datastream from the host transport code 56 and transmits a transport event to entry point X3 of the datastream processing component 42. The datastream is fed to the rest of the HOD mainline processing which parses and displays the data (schematically illustrated by arrow 57) to a user via a graphical user interface (GUI) within the workstation 30. Mainline processing means the entire host access processing of HOD including transport, datastream, presentation space, session state, and display.

A user can input data 58 (i.e., a host command such as "logon") to transmit to the host 20. The mainline processing processes the user input to construct an inbound datastream and transmits it as a transport event (send, datastream) 59 to entry point X4 of the user transport component 36. The user transport component 36 wraps the datastream in its transport format and forwards it (schematically illustrated by arrow 60) to the host 20. The host 20 then responds back with the next outbound datastream 61. The session is now in a repetitive pattern of end user interactions with the host 20 until the user ends the session 13.

A session termination request (schematically illustrated by arrow 62) made by a user is caught at entry point X5 by the datastream processing component 42. The datastream processing component 42 transmits a transport (disconnect) event to entry point X6 of the user transport component 36 (schematically illustrated by arrow 63) to allow the user transport component 36 to close the host connection. The connection is then closed (schematically illustrated by arrows 64 and 65).

Reusable Host Access Components

According to another aspect of the present invention, host access software, such as HOD, can be redesigned into a collection of dynamically connectable and reusable, self-contained, functional components, referred to as Host Access "beans", that software developers can use to generate host access applications. Each bean is based on a main host access task performed frequently by an application (e.g., a host access application). For example, a bean provides a traditional host interaction terminal window that user host access applications can embed in their own GUI design (or style) easily.

Figure 7:
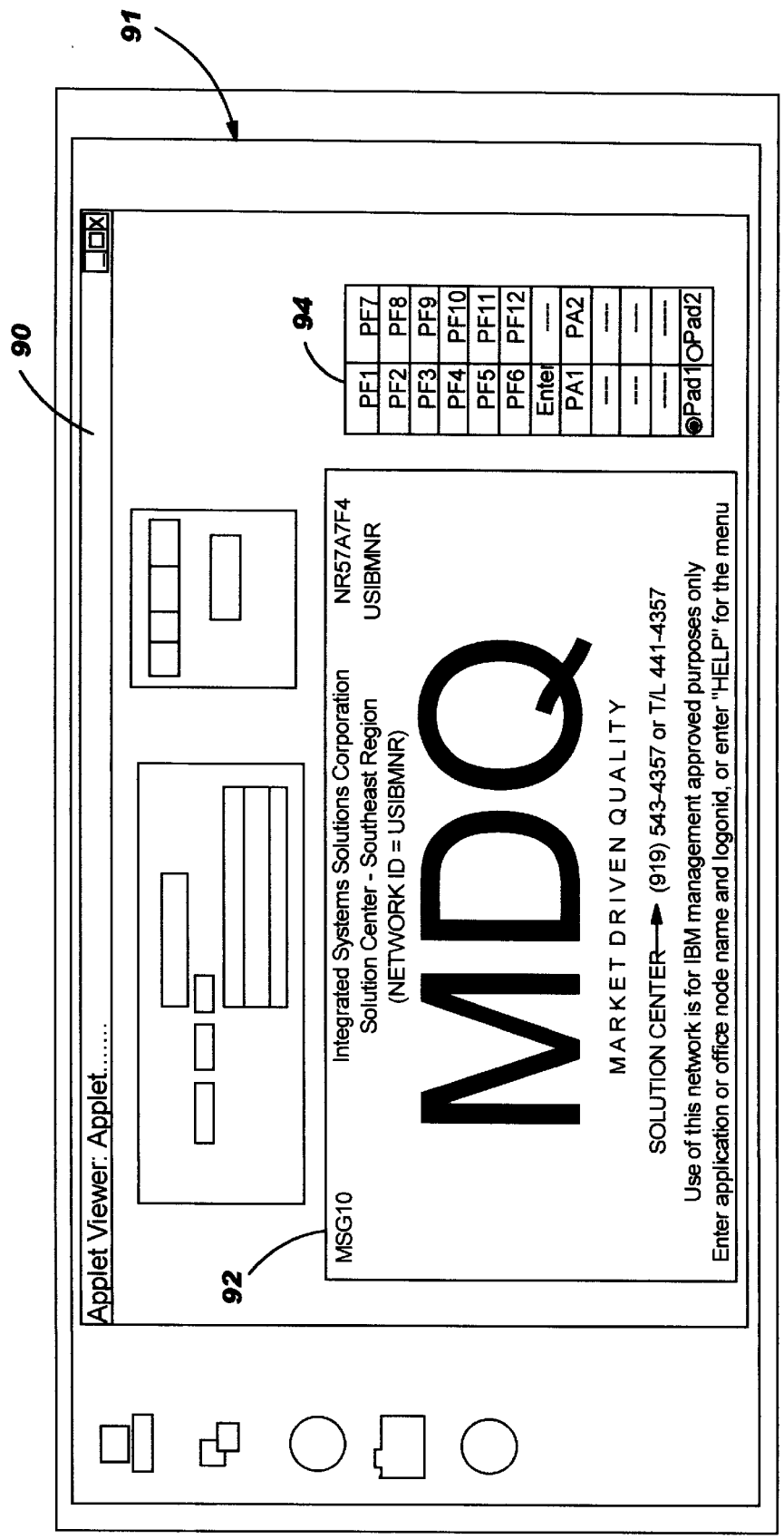
FIG. 7 illustrates an application window generated by three Host Access reusable components (beans) running within a browser window.

FIG. 7 illustrates an application window 90 running within a browser window 91. The application window 90 is generated by three Host Access beans. A Session Screen bean provides the host terminal display area 92. A Function Keypad bean provides point and click access for terminal function keys 94. A User Control bean serves as a driver for the terminal display area 92. Users may interact with the terminal display area 92 directly from a keyboard and pointing device.

Figure 8A:
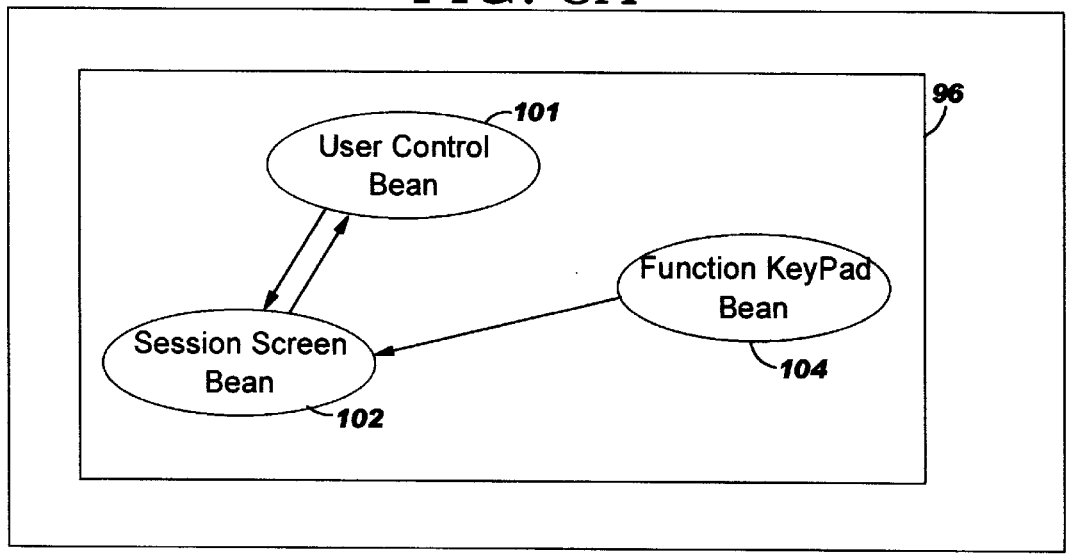
FIGS. 8A–8B schematically illustrate wiring and run time flow of the reusable components, according to the present invention.
Figure 8B:
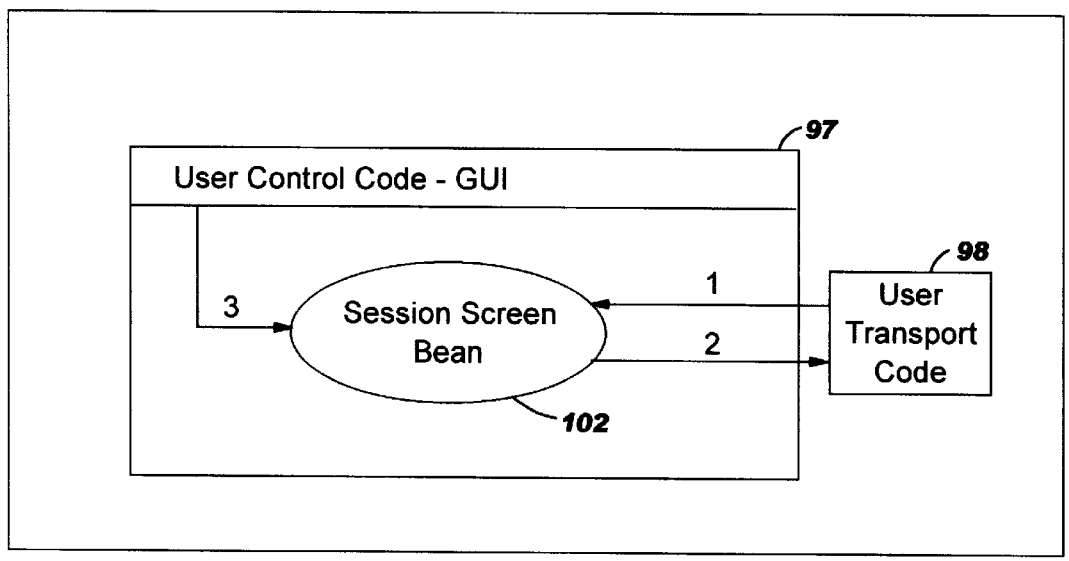

Using a Visual Builder language, such as VisualCafe 2.0 (Symantec Corp., Eugene, Oreg., www.symantec.com), an application may be developed by placing beans on a blank form (i.e., a development time window space) and connecting (also referred to as "wiring") the beans together. Wiring is based on the bean event handler interfaces described in detail below. FIGS. 8A and 8B schematically illustrate wiring and run time flow utilizing a graphic development environment. In FIG. 8A, the box 96 represents a blank window space form where the three beans of FIG. 7 were placed at development time. A User Control bean 101 is connected to a Session Screen bean 102 to make the Session Screen bean 102 listen to User Control events at run time. A Function Keypad bean 104 is connected to the Session Screen bean 102 in a similar manner. The Session Screen bean 102 is connected back to the User Control bean to pass status information. At run time, the Session Screen bean 102 receives events from a local keyboard and the Function Keypad bean 104 to interact with the host. The Session Screen bean 102 also generates session status events to send back to the User Control bean. FIG. 8C illustrates an actual development window 96 containing User Control Bean 101, Session Screen bean 102, and Function Keypad Bean 104.

A user application may follow the flow of the three beans of FIG. 8A when designing its host access components. If an application wants to follow its own GUI convention, the application wraps the Session Screen bean 102 with its own GUI design such as a menubar or toolbar. The application's GUI code can be wired into the Session Screen bean 102 directly. The User Control bean provides a good sample source on how to generate the GUI code in this case.

Some applications may need to provide their own data transport logic. For example, an application may need to implement a private transport code that supports a custom encryption mechanism. The Session Screen bean 102 provides a transport interface to allow an application to incorporate its own transport logic for individual host sessions without the need to modify any base code. This broadens the HOD computing connectivity from TCP/IP to other standard protocols such as SNA as well as to private protocols and makes Host Access beans deployable with different networking transport mechanisms.

FIG. 8B illustrates the flow of a transport interface. The Session Screen bean 102 is dropped on a blank window space form represented by the center box 97. The user transport code 98 is outside the center box 97 which means it does not have a visual component. The transport code 98 is wired (schematically illustrated by arrow 1) to the Session Screen bean 102 and vice versa (schematically illustrated by arrow 2). At run time the application will establish host connections using the user transport code 98. Datastreams (e.g. 3270 datastreams) exchanged between host applications and the Session Screen bean 102 are wrapped in the transport code's format. Outbound datastreams from the host need to be unwrapped in the transport code and transmitted as transport (receive) events (schematically illustrated by arrow 1) to the Session Screen bean 102. Inbound datastreams to the host are transmitted as transport (send) events (schematically illustrated by arrow 2) by the Session Screen bean 102 to the user transport code 98, which wraps them in its transport format and sends them across the network to the host.

The Session Screen bean 102 also transmits transport (connect) and transport (disconnect) events (schematically illustrated by arrow 2) to the user transport code 98 when it receives a request to connect or disconnect the session (schematically illustrated by arrow 3) from the User Control bean 101, in this case from the application's own GUI.

The dynamic transport switching interface described above provides a structure for an application to tightly integrate its own session initiation/termination and data transport logic into the mainline session processing flow. In a typical scenario, an end user will click on a connect (or start communication) button to cause a Session Screen bean 102 to receive control (schematically illustrated by arrow 3). Because the user transport code 98 is listening, the Session Screen bean 102 transmits a transport (connect) event (schematically illustrated by arrow 2) to the user transport code 98 to allow the application to make the connection to the host, in its own transport format. At the end of the connection sequence, the host will send over an initial welcome message embedded in the application's transport format.

The transport code 98 extracts the message datastream and transmits a transport (receive) event over to the Session Screen bean 102(schematically illustrated by arrow 1), which parses and displays the data in its normal mainline processing. The end user can now key in a host logon request. The Session Screen bean 102 will construct the request datastream and transmit it over as a transport (send) event (schematically illustrated by arrow 2) to the user transport code 98. The user transport code 98 wraps the datastream in the application's transport format and forwards it to the host. The host then responds with a "logon successful" message (typically a "system ready" message) in order that the end user is prompted to key in the next request. The session is now in a repetitive pattern of end user interactions with the host until the end user clicks on a disconnect (or stop communication) button or the Session Screen window is closed. In that case the Session Screen bean 102 will transmit a transport (disconnect) event over (schematically illustrated by arrow 2) to allow the application to close the connection. As described above, if there is no listener to the transport event, the Session Screen bean 102 will use its default transport mechanism for the host session.

Figure 9:
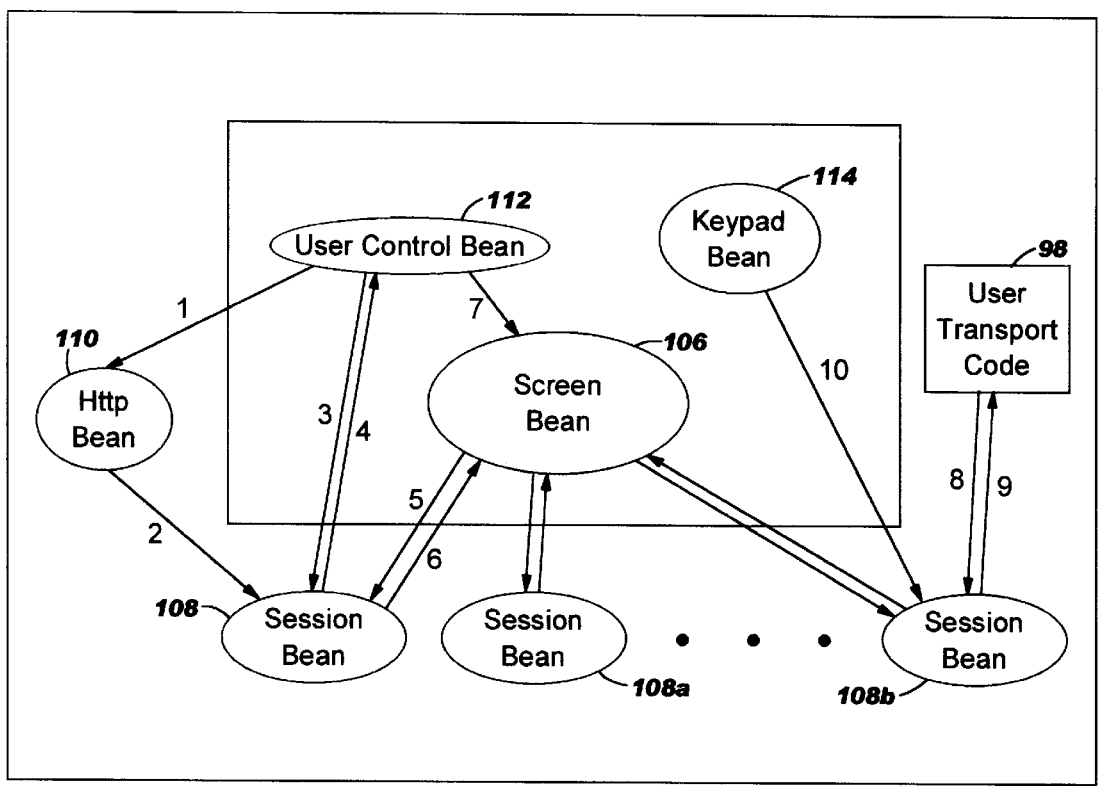
FIG. 9 schematically illustrates another embodiment of the present invention wherein a Host File Transfer (Hftp) bean is added to provide host file upload and download functionality.

Referring now to FIG. 9, another scenario for an application developed in accordance with the present invention is illustrated. A Host File Transfer (Hftp) bean 110 is added to provide host file upload and download. The Session Screen bean 102 is split into two beans, Session bean 108 and Screen bean 106. The User Control bean 112 can trigger Host File Transfer (schematically illustrated by arrow 1) which will prompt for user selections to generate a file transfer request event for the Session bean 108 (schematically illustrated by arrow 2). The Session bean 108 can handle the file transfer function without the need of the Screen bean 106.

Separate Session and Screen beans may provide flexibility because applications can omit the host data screen display component, share a single display with multiple sessions, or split the display and host access processing to two physical machines for client/server solutions. Additional wiring interfaces are provided to accommodate this flexibility. New interfaces are added for wiring the Session bean 108 and the Screen bean 106 together (schematically illustrated by arrows 5,6) and for transmitting User Control events to the Screen bean 106 (schematically illustrated by arrow 7). As a result of the split, the Session bean 108b interacts directly with user's transport code 98 (schematically illustrated by arrows 8,9).

User control bean 112 (schematically illustrated by arrows 3, 4, and 7) can interact with both the Session bean 108 and Screen bean 106. The Keypad bean 114 sends function key events (schematically illustrated by arrow 10) to the Session bean 108b. Multiple Session beans in the scenario illustrate the application flexibility given by the present invention. A Session bean 108 is used to perform a file transfer request to host A. Another Session bean 108a is used for normal interactions with host B. While a third Session bean 108b is used to interact with host C using user provided transport code 98. The second and third Session beans use the same Screen bean 106 to display host data. In this case the User Control bean 112 is used to switch which host data is to be displayed by the Screen bean at present.

Individual Host Access Bean Descriptions

The following are individual Host Access bean descriptions referenced above. Each bean represents a discrete unit of a Host Access function that can be connected (wired) together to form the main body of an application. Each bean includes a set of methods, events, and properties used for wiring. Properties define the variables that can be set at design time and most of them are modifiable at run time. Events define outbound requests and information a bean generates at run time. Methods define actions a bean will perform for incoming events from other beans or directly from user applications. The wiring is done primarily through visual builder generated code, such as from VisualCafe and VisualAge for Java (IBM). Developers can also code the wiring from scratch through programming languages such as Java®.

Methods may fall into two categories: individual event handlers and bean event handlers. Individual event handlers expose bean actions for direct wiring from user applications. This is useful for developing simple applications. For example, the Session Screen Bean exposes individual session open and close event handlers. An application can create two buttons wired to the OPEN and CLOSE event methods to provide a simple host terminal access function. At run time, a terminal window becomes live when a user clicks on the OPEN button, and terminates when the user clicks on the CLOSE button.

Bean event handlers are used between beans. For example, a Session Screen Bean provides a Keypad event handler to receive keypad events. Once a Session Screen bean and a Keypad bean are wired together, when a user clicks on a keypad button, the button event will be transmitted to a Session Screen bean for processing. The reverse direction is not needed. Therefore the bean event handlers actually define the interfaces among the beans. At design time application developers can follow the directions defined for the wiring. Developers can also add their own logic to interact with the bean event model. For example, the Screen Bean listens to the Session bean which includes a session updated indicator. If an application cares about only specific strings in the datastream but not the whole screen, it can provide its own user bean to capture the indicator from the Session Bean and extract just the data of interest.

Session Screen Bean

A Session Screen bean starts a host session using HOD's transport and displays 3270/525ONT text in a black screen that interacts with the keyboard. For applets that provide their own transport, they can register with the Session Screen Bean as action listeners for session initiation/termination and datastream send/receive events. The Session Screen bean will transmit transport events and interact with the applets which perform their own transport mechanisms. The following methods and properties will be exposed. The term "exposed" means the methods and properties are defined in the proper bean descriptor classes such that a visual programming environment, such as VisualCafe, can find them through the introspection interfaces provided by the underlying component software architecture, in this case JavaBeans.

| Methods |
| --- |
| Open/Close session |
| Transport event handler (Send/Receive datastreams and Connect/Disconnect from transport) |
| Keypad (or Send Key) event handler |
| User control event handler |
| Host File Transfer event handler |

-continued

| Methods |
| --- |
| Copy/Cut/Paste screens
Print screens
Add/Remove (from the application display window)
Size (dynamic adjusting fonts)
Move(change display position)
Set/Get properties: Connecting server name and port, Session type, Terminal Model type, host code page table, and Color schemes |

| Properties |
| --- |
| Server name
Server port
Session type
Terminal Model type
Host code page table
Color schemes
Font size
Size (maximum border of the screen) |

| Events |
| --- |
| Session Status
Transport event
File transfer progress |

A Session Screen bean may include a visual component that appears on an application's window space at run time.

Function Keypad Bean

A Function Keypad bean displays a current HOD keypad that interacts with the Session Screen bean or Screen Bean. The following methods and properties will be exposed:

| Methods |
| --- |
| Key pressed
Add/Remove (from the application display window)
Size (dynamic adjusting function key buttons and fonts)
Move(change display position) |

| Properties |
| --- |
| Keypad layout
Font Size |

| Events |
| --- |
| Send key |

A Function Keypad bean includes a visual component that will appear on the application's window space at run time.

User Control Bean

A User Control Bean provides a simple GUI panel for users to drive a Session Screen bean, Session bean, and Session Screen bean. From the panel, users can change session properties dynamically at run time, connect or disconnect from different hosts, and be able to copy, cut, paste, and print the content of current screens. The following methods and properties will be exposed:

| Methods |
| --- |
| Add/Remove (from the application display window)
Size (dynamic adjusting fonts)
Move(change display position) |

| Properties |
| --- |
| Font size
Background color
Border presence |

| Events |
| --- |
| User control event |

A User Control Bean includes a visual component that will appear on the application's window space at run time.

Session Bean

A Session Bean starts a host session using HOD's transport but does not provide the display. For applets that provide their own transport, they can register with the Session bean as action listeners for session initiation/termination and datastream send/receive events. A Session Bean will transmit transport events and interact with the applets which perform their own transport mechanisms. A Session bean holds the state of a session and interacts with other Host Access beans to make user application communicate with host applications. The following methods and properties will be provided:

| Methods |
| --- |
| Open/Close sessions
Transport event handler (Send/Receive datastreams and Connect/Disconnect from transport)
Screen event handler
User control event handler
Host File Transfer event handler
Send key (Do Host command)
Add/Remove (from the application display window)
Size (dynamic adjusting fonts)
Move (change display position)
Set/Get properties: Connecting server name and port, Session type, Terminal Model type, host code page table, and Color schemes |

| Properties |
| --- |
| Server name |
| Server port |
| Session type |
| Terminal Model type |
| Host code page table |
| Color schemes |
| Font size |

| Events |
| --- |
| Transport event |
| Session event |
| Session status |
| File transfer progress |

A Session Bean does not include any visual component that will appear on the application's window space at run time.

Screen Bean

A Screen Bean provides a display area for host data. When wired from a Session bean, a Screen bean listens to Session events to update the display area. When wired to a Session Bean, a Screen bean transmits keyboard and Function Keypad events and the requests to Copy/Cut/Paste/Print screens to Session. Multiple Sessions can share a single Screen. User applications can switch the display by changing the session identifier property of Screen. The following methods and properties will be provided:

| Methods |
| --- |
| Session event handler |
| Keypad event handler |
| User Control event handler |
| Copy/Cut/Paste/Print screen |
| Add/Remove (from the application display window) |
| Move (change display position) |
| Set/Get properties: session identifier |

| Properties |
| --- |
| Size (maximum border of the screen |
| Session identifier |

| Events |
| --- |
| Send key |

A Screen Bean includes a visual component that will appear on the application's window space at run time.

File Transfer Bean

A File Transfer bean pops up a default file transfer dialog box to let a user send and receive files from a host. A File Transfer bean should be wired to a Session bean to submit file transfer requests. The following methods and properties will be provided:

| Methods |
| --- |
| Progress Handler |
| Properties |
| None |

| Events |
| --- |
| File transfer event |

A File Transfer Bean includes a visual component that will appear on the application's window space at run time.

It will be understood that each block of the flowchart illustrations of FIGS. 3A–3C and combinations of blocks in the flowchart illustrations of FIG. 3A–3C, as well as FIGS. 4, 5, 6, 8A, 8B, 8C and 9, can be implemented by computer program instructions. These program instructions may be provided to a processor to produce a machine, such that the instructions which execute on the processor create means for implementing the functions specified in the flowchart block or blocks. The computer program instructions may be executed by a processor to cause a series of operational steps to be performed by the processor to produce a computer implemented process such that the instructions which execute on the processor provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based systems which perform the specified functions or steps, or combinations of special purpose hardware and computer instructions.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A method of modifying mainframe host communications software to include user-provided transport code for sending and receiving datastreams to and from a mainframe host via a persistent connection with the mainframe host, the method comprising the steps of:

provonerviding a user transport code component to the mainframe host communications software, wherein the user transport code component sends and receives datastreams to and from the mainframe host via the persistent connection; and dynamically linking a datastream processing component of the mainframe host communications software to the user transport code component such that datastreams sent or received by the mainframe host communications software are sent to and received by the user transport code component.

2. A method according to claim 1 wherein the step of dynamically linking a datastream processing component of the mainframe host communications software to the user transport code component comprises providing interfaces to listen and handle transport events associated with sending and receiving datastreams to and from the mainframe host communications software.

3. A method according to claim 1 wherein the user transport code component is a bean.

4. A method according to claim 1 wherein the datastream processing component is a bean.

5. A method of sending and receiving datastreams to and from a mainframe host via mainframe host communications software, the method comprising the steps of:

providing mainframe host communications software including a mainframe host datastream processing component dynamically linked with a user transport component, wherein the user transport component includes transport protocol different from a transport protocol of the mainframe host communications software;

transmitting a start mainframe host session request to the mainframe host datastream processing component;

responsive to receiving the start mainframe host session request, transmitting a transport event from the mainframe host datastream processing component to the user transport component;

responsive to receiving the transport event, establishing a persistent connection with a mainframe host via the user transport component; and for outbound datastreams received by the user transport component from the mainframe host via the persistent connection, unwrapping the outbound datastreams from format code of the mainframe host communications software.

6. A method according to claim 5 further comprising:

transmitting inbound datastreams constructed by the mainframe host datastream processing component to the user transport component;

wrapping, via the user transport component, the received inbound datastreams in a transport format of the user transport component; and transmitting the wrapped inbound datastreams to the mainframe host via the persistent connection.

7. A method according to claim 5 wherein the user transport code component and datastream processing component are respective beans.

8. A method of generating a mainframe host access application, the method comprising the steps of:

placing a plurality of dynamically connectable, reusable components within a development space, wherein each dynamically connectable, reusable component is configured to perform a respective mainframe host access application task; and interconnecting the dynamically connectable, reusable components such that the dynamically connectable, reusable components can transmit and receive information therebetween so as to function as a mainframe host access application at run time.

9. A method according to claim 8 further comprising interconnecting the dynamically connectable, reusable components to a user transport code component, wherein the user transport code component is configured to send and receive datastreams to and from a mainframe host via a persistent connection with the mainframe host.

10. A method according to claim 8 wherein each of the dynamically connectable, reusable components are respective beans.

11. A method according to claim 8 wherein the dynamically connectable, reusable components comprise a user control bean, a session screen bean, and a function keypad bean.

12. A method according to claim 8 wherein each of the dynamically connectable, reusable components can be wrapped within mainframe host access application code.

13. A computer program product for modifying mainframe host communications software to include user-provided transport code for sending and receiving datastreams to and from a mainframe host via a persistent connection with the mainframe host, the computer program product comprising a computer usable storage medium having computer readable program code means embodied in the medium, the computer readable program code means comprising:

computer readable program code means for providing a user transport code component to the mainframe host communications software, wherein the user transport code component sends and receives datastreams to and from the mainframe host via the persistent connection; and computer readable program code means for dynamically linking a datastream processing component of the mainframe host communications software to the user transport code component such that datastreams sent or received by the mainframe host communications software are sent to and received by the user transport code component.

14. A computer program product according to claim 13 wherein the computer readable program code means for dynamically linking a datastream processing component of the mainframe host communications software and the user transport code component comprises computer readable program code means embodied in the medium for providing interfaces to listen and handle the transport events associated with sending and receiving datastreams to and from the mainframe host communications software.

15. A computer program product according to claim 13 wherein the user transport code component is a bean.

16. A computer program product according to claim 13 wherein the datastream processing component is a bean.

17. A computer program product for sending and receiving datastreams to and from a mainframe host via mainframe host communications software via a persistent connection with the mainframe host, the computer program product comprising a computer usable storage medium having computer readable program code means embodied in the medium, the computer readable program code means comprising:

computer readable program code means for providing mainframe host communications software including a mainframe host datastream processing component dynamically linked with a user transport component, wherein the user transport component includes transport protocol different from a transport protocol of the mainframe host communications software;

computer readable program code means for transmitting a start mainframe host session request to the mainframe host datastream processing component;

computer readable program code means, responsive to receiving the start mainframe host session request, for transmitting a transport event from the mainframe host datastream processing component to the user transport component;

computer readable program code means, responsive to receiving the transport event, for establishing a persistent connection with a mainframe host via the user transport component; and for outbound datastreams received by the user transport component from the mainframe host, computer readable program code means for unwrapping the outbound datastreams from format code of the mainframe host communications software.

18. A computer program product according to claim 17 further comprising:

computer readable program code means for transmitting inbound datastreams constructed by the mainframe host datastream processing component to the user transport component;

computer readable program code means for wrapping, via the user transport component, the received inbound datastreams in a transport format of the user transport component; and computer readable program code means for transmitting the wrapped inbound datastreams to the mainframe host via the persistent connection.

19. A computer program product according to claim 17 wherein the user transport code component and datastream processing component are respective beans.

20. A computer program product for generating a mainframe host access application, the computer program product comprising a computer usable storage medium having computer readable program code means embodied in the medium, the computer readable program code means comprising:

computer readable program code means for placing a plurality of dynamically connectable, reusable components within a development space, wherein each dynamically connectable, reusable component is configured to perform a respective mainframe host access application task; and computer readable program code means for interconnecting the dynamically connectable, reusable components such that the dynamically connectable, reusable components can transmit and receive information therebetween so as to function as a mainframe host access application at run time.

21. A computer program product according to claim 20 further comprising computer readable program code means for interconnecting the dynamically connectable, reusable components to a user transport code component, wherein the user transport code component is configured to send and receive datastreams to and from a mainframe host via a persistent connection.

22. A computer program product according to claim 20 wherein each of the dynamically connectable, reusable components are respective beans.

23. A computer program product according to claim 20 wherein the dynamically connectable, reusable components comprise a user control bean, a session screen bean, and a function keypad bean.

24. A computer program product according to claim 20 wherein each of the dynamically connectable, reusable components can be wrapped within mainframe host access application code.

25. A system for modifying mainframe host communications software to include user-provided transport code for sending and receiving datastreams to and from a mainframe host via a persistent connection with the mainframe host, comprising:

means for providing a user transport code component to the mainframe host communications software, wherein the user transport code component sends and receives datastreams to and from the mainframe host via the persistent connection; and means for dynamically linking a datastream processing component of the mainframe host communications software to the user transport code component such that datastreams sent or received by the mainframe host communications software are sent to and received by the user transport code component.

26. A system according to claim 25 wherein the means for dynamically linking a datastream processing component of the mainframe host communications software to the user transport code component comprises means for providing interfaces to listen and handle the transport events associated with sending and receiving datastreams to and from the mainframe host communications software.

27. A system according to claim 25 wherein the user transport code component is a bean.

28. A system according to claim 25 wherein the datastream processing component is a bean.

29. A system for sending and receiving datastreams to and from a mainframe host via mainframe host communications software via a persistent connection with the mainframe host, comprising:

means for providing mainframe host communications software including a mainframe host datastream processing component dynamically linked with a user transport component, wherein the user transport component includes transport protocol different from a transport protocol of the mainframe host communications software;

means for transmitting a start mainframe host session request to the host mainframe datastream processing component;

means, responsive to receiving the start mainframe host session request, for transmitting a transport event from the mainframe host datastream processing component to the user transport component;

means, responsive to receiving the transport event, for establishing a persistent connection with a mainframe host via the user transport component; and for outbound datastreams received by the user transport component from the mainframe host, means for unwrapping the outbound datastreams from format code of the mainframe host communications software.

30. A system according to claim 29 further comprising:

means for transmitting inbound datastreams constructed by the mainframe host datastream processing component to the user transport component;

means for wrapping, via the user transport component, the received inbound datastreams in a transport format of the user transport component; and means for transmitting the wrapped inbound datastreams to the mainframe host via the persistent connection.

31. A system according to claim 29 wherein the user transport code component and datastream processing component are respective beans.

32. A system for generating a mainframe host access application, comprising:

means for placing a plurality of dynamically connectable, reusable components within a development space, wherein each dynamically connectable, reusable component is configured to perform a respective mainframe host access application task; and means for interconnecting the dynamically connectable, reusable components such that the dynamically connectable, reusable components can transmit and receive information therebetween so as to function as a mainframe host access application at run time.

33. A system according to claim 32 further comprising means for interconnecting the dynamically connectable, reusable components to a user transport code component, wherein the user transport code component is configured to send and receive datastreams to and from a mainframe host via a persistent connection.

34. A system according to claim 32 wherein each of the dynamically connectable, reusable components are respective beans.

35. A system according to claim 32 wherein the dynamically connectable, reusable components comprise a user control bean, a session screen bean, and a function keypad bean.

36. A system according to claim 32 wherein each of the dynamically connectable, reusable components can be wrapped within mainframe host access application code.

* * * * *